United States Patent [19]

Yamamoto

[11] Patent Number: 5,410,915
[45] Date of Patent: May 2, 1995

[54] CAPACITIVE ACCELERATION DETECTOR

[75] Inventor: Masahiro Yamamoto, Itami, Japan

[73] Assignee: Mitsubishi Denki Kabushiki Kaisha, Tokyo, Japan

[21] Appl. No.: 45,726

[22] Filed: Apr. 14, 1993

[30] Foreign Application Priority Data

Dec. 16, 1992 [JP] Japan .................................. 4-336096

[51] Int. Cl.6 ........................................... G01P 15/125
[52] U.S. Cl. .................................................. 73/517 R
[58] Field of Search ................. 73/517 R, 516 R, 514, 73/515, 497, 651, 522

[56] References Cited

U.S. PATENT DOCUMENTS

| 4,435,737 | 3/1984 | Colton | 73/517 R |
| 5,092,171 | 3/1992 | Wallrafen | 73/516 LM |
| 5,092,174 | 3/1992 | Reidemeister et al. | 73/517 R |
| 5,228,341 | 7/1993 | Tsuchitani et al. | 73/588 R |

FOREIGN PATENT DOCUMENTS 9111722  8/1991  WIPO ............................... 73/517 R

Primary Examiner—Hezron E. Williams
Assistant Examiner—Helen C. Kwok
Attorney, Agent, or Firm—Leydig, Voit & Mayer

[57] ABSTRACT

A capacitive acceleration detector in which a fixed electrode is provided on a supporting substrate of a pedestal except opposite a diaphragm of an acceleration detecting beam. A broken or missing acceleration detecting beam is reliably detected because the electrical capacitance between a movable electrode and the fixed electrode is almost zero when the acceleration detecting beam breaks off at the diaphragm.

4 Claims, 3 Drawing Sheets

CAPACITIVE ACCELERATION DETECTOR

BACKGROUND OF THE INVENTION

1. Field of the Invention

The present invention relates to capacitive acceleration detectors, and more particularly to capacitive acceleration detectors used in various applications such as in automobiles.

2. Description of the Related Art

Referring to FIG. 3, there is shown a sectional side view of a conventional capacitive acceleration detector wherein an acceleration detecting beam 2 of a cantilever structure is supported by a pedestal 1 at the end of the beam 2, and moves in the applied direction of an applied acceleration. A diaphragm 5, which is a thin part of the acceleration detecting beam to improve acceleration detection sensitivity is provided on the acceleration detecting beam 2. A movable electrode 3 is provided on the pedestal side surface of the acceleration detecting beam 2, and the movable electrode 3 is electrically connected to an electrode section located at top of the pedestal 1.

The pedestal 1 is mounted on the surface of a glass plate 6 used as a supporting plate of the pedestal 1, and the glass plate 6 is placed on an armoring substrate 4. A fixed electrode 7 is provided on the surface of the glass plate 8 opposed to the movable electrode 3 and not electrically connected to the pedestal 1. Electrical signals from the fixed electrode 7 are transmitted from a lead pin 10a through a wire 8a. The lead pin 10a is electrically insulated by an insulating material 9 such as a glass. On the other hand, electrical signals from the movable electrode 3 are transmitted from the electrode section 1a through a wire 8b. The pedestal 1, the acceleration detecting beam 2, and other elements are protected and covered by a cover 11, and the inside of which is filled with dielectric oil 12 in order to protect the acceleration detecting beam 2 and to increase the dielectric constant.

Conventional capacitive acceleration detectors are arranged as mentioned above and operate as follows. A potential is provided through the lead pins 10a, 10b and the electrical capacitor between the movable electrode 3 and the fixed electrode 7 is charged. When acceleration is applied to the acceleration detector, the movable electrode 3 is displaced relative to the fixed electrode 7 as the acceleration detecting beam is bent. The displacement results in changing of the electrical capacitor between the electrodes. The capacitive change is converted to an AC signal and detected as an acceleration.

In the capacitive acceleration detector when the acceleration detecting beam 2 is broken and lacks the diaphragm section 5, if the beam 2 does not completely break off, it hangs down from the movable electrode 3. Incorrect signals are produced when an acceleration is applied. Even if the beam 2 completely breaks off, if it breaks off from a portion A in FIG. 3, there is a problem in that a malfunction could occur because a section 3A of the movable electrode remains.

SUMMARY OF THE INVENTION

Accordingly, the object of the present invention is to overcome such a problem and to provide a capacitive acceleration detector which can discriminate malfunctions of the detector and detect breaking off of the acceleration detecting beam.

Viewed from one aspect, the present invention is directed to a capacitive acceleration detector comprising: an acceleration detecting beam including a thin diaphragm; a movable electrode on one surface of the acceleration detecting beam; a pedestal which supports the acceleration detector at an end near the diaphragm; a supporting substrate; a fixed electrode on the supporting substrate except opposite the diaphragm, spaced from and opposite to the movable electrode; a base substrate on which the supporting substrate is mounted; and lead pins which are I electrically connected to the movable electrode and the fixed electrode; respectively, to conduct signals to the outside.

DESCRIPTION OF THE PREFERRED EMBODIMENTS

Figure 1:
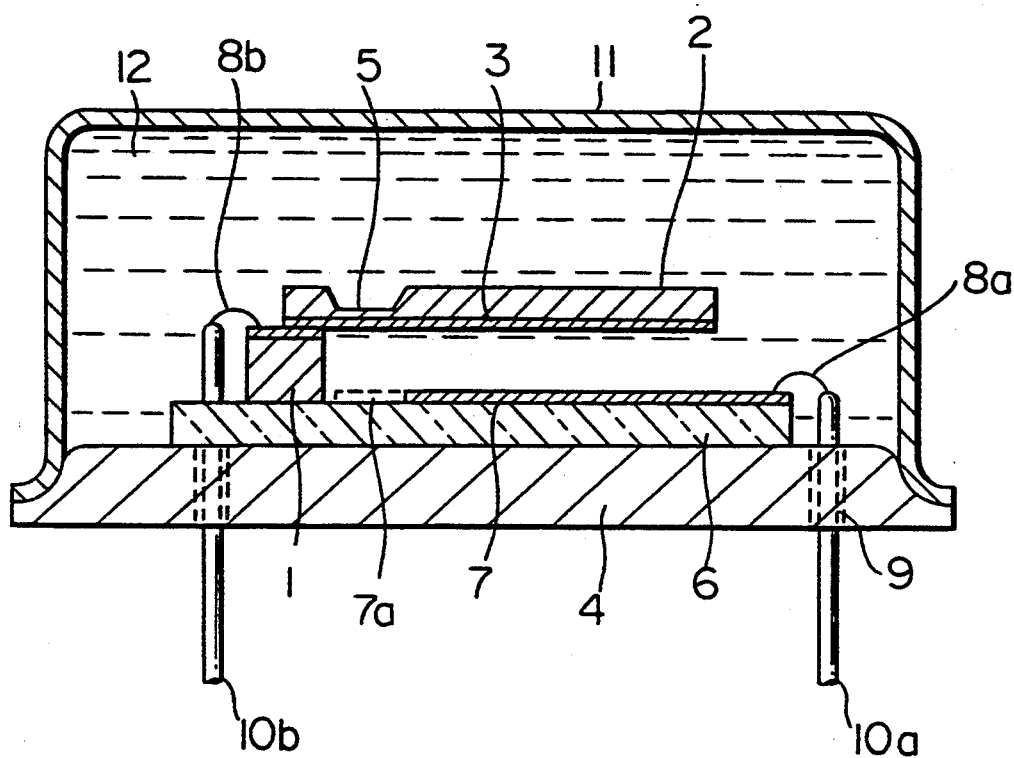
FIG. 1 is a sectional side view of a capacitive acceleration detector of a preferred embodiment of the present invention.

An embodiment of this invention will be described in the following with reference to the accompanying drawings. Referring now to FIG. 1, there is shown a sectional side view of a capacitive acceleration detector of a preferred embodiment of the invention. In all of the drawings, the members denoted by the same reference numerals are the same or equivalent members. In FIG. 1, an part 7a opposite the diaphragm 5 is missing from the fixed electrode 7. That is, by not extending the fixed electrode 7 in the region opposite to the diaphragm 5, electrical capacitance can no longer be charged under no-load conditions when the beam 2 is broken. When the acceleration detecting beam 2 breaks off because the diaphragm 5 is broken, the electrical capacitance value becomes very small or zero. Accordingly, the absence of the acceleration detecting beam 2 can be detected by checking the electrical capacitance valve. Malfunctions are also prevented as electrical capacitance becomes almost zero.

Figure 2:
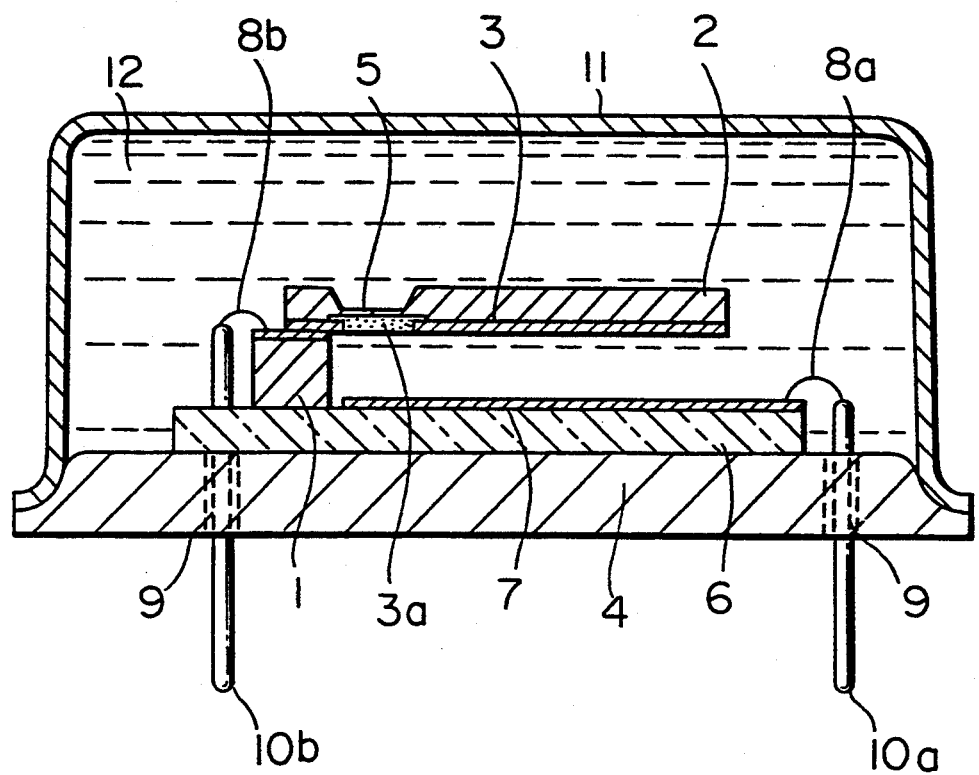
FIG. 2 is a sectional side view of a capacitive acceleration detector of a preferred embodiment of the present invention.
Figure 3:
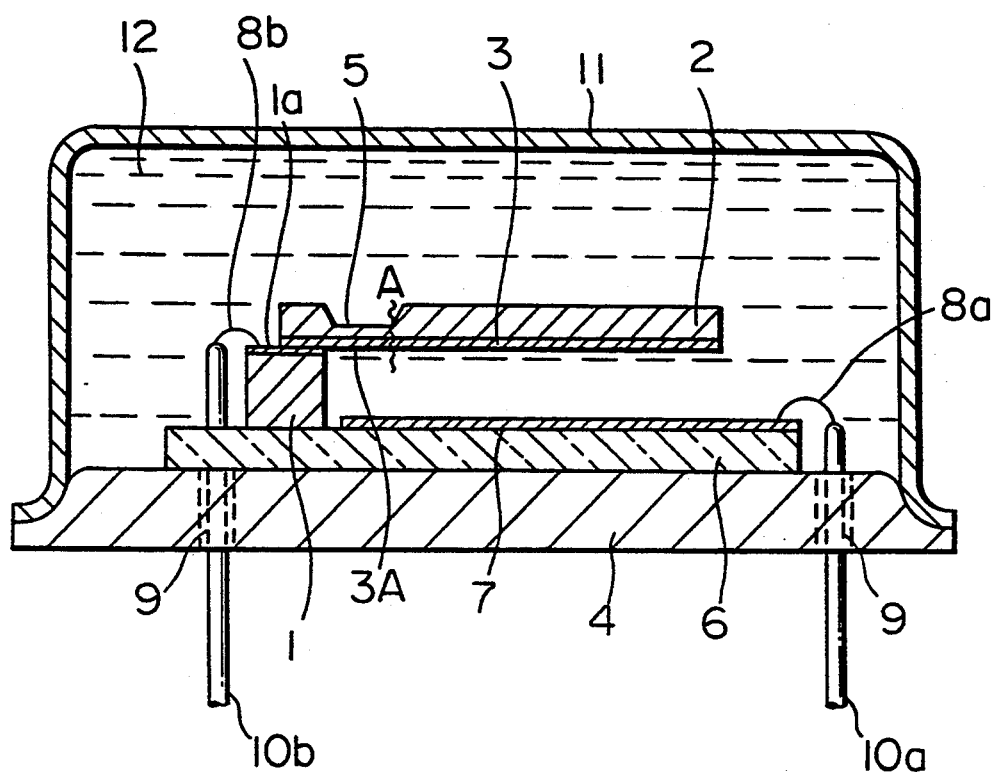
FIG. 3 is a sectional side view of a conventional capacitive acceleration detector.

Referring now to FIG. 2, there is shown a sectional side view of a capacitive acceleration detector of a preferred embodiment in accordance with this invention. In FIG. 2, a rear surface of the diaphragm of the acceleration detecting beam is not provided with a movable electrode but provided with diffusion wiring section 3a, i.e., a conducting region formed by the diffusion of dopant impurities which is made of diffusion resistances. Accordingly, when the acceleration detecting beam is fractured at the diaphragm 5, the acceleration detecting beam 2 breaks out completely because it is a brittle material, for example, silicon. Silicon is a well known semiconductor material in which conducting regions can be formed by the diffusion of dopant impurities. Because of its crystalline structure, silicon is brittle. The absence of the acceleration detecting beam 2 is reliably detected because the electrical capacitance between the electrodes becomes zero because the electrically conducting diffusion wiring section 3a cannot be electrically charged.

As set forth hereinabove, the present invention provides a highly reliable capacitive acceleration detector in which a broken and missing acceleration detecting beam 2 can be reliably detected as the electrical capacitance between the movable electrode and the fixed electrode is almost zero when the acceleration detecting beam breaks off at the diaphragm section.

What is claimed is:

1. A capacitive acceleration detector comprising:

an acceleration detecting beam including opposed first and second ends and a thinner flexing portion intermediate the first and second ends;

a first electrode disposed on said acceleration detecting beam and extending from the first end to the second end;

a pedestal supporting said acceleration detecting beam at the first end, the second end being free to move in response to an acceleration, flexing the thinner flexing portion of said acceleration detecting beam;

a supporting substrate supporting said pedestal;

a fixed electrode disposed on said supporting substrate opposite and spaced from said first electrode, said fixed electrode extending from a position opposite the second end of said acceleration detecting beam toward a position opposite the thinner flexing portion of said acceleration detecting beam and ending before reaching a position opposite the thinner flexing portion of said acceleration detecting beam;

a base substrate on which said supporting substrate is mounted; and first and second lead pins electrically connected to said first electrode and said fixed electrode, respectively, for conducting signals from said first and fixed electrodes.

2. The capacitive acceleration detector of claim 1 including a cover attached to said base substrate covering said first electrode, said pedestal, said supporting substrate, and said fixed electrode and a dielectric oil filling the space between said cover and said base substrate.

3. A capacitive acceleration detector comprising:

an acceleration detecting beam including opposed first and second ends and a thinner flexing portion intermediate the first and second ends;

a first electrode disposed on said acceleration detecting beam and having first and second parts, the first part of said first electrode extending from the first end of said acceleration detecting beam to the thinner flexing portion of said acceleration detecting beam and the second part of said first electrode extending from the second end of said acceleration detecting beam to the thinner flexing portion of said acceleration detecting beam, the first electrode including a diffusion wiring section disposed between and electrically connecting the first part of said first electrode to the second part of said first electrode;

a pedestal supporting said acceleration detecting beam at the first end of said acceleration detecting beam, the second end of said acceleration detecting beam being free to move in response to an acceleration, flexing the thinner flexing portion of said acceleration detecting beam;

a supporting substrate supporting said pedestal;

a fixed electrode disposed on said supporting substrate opposite and spaced from aid first electrode, said fixed electrode extending from a position opposite the second end of said acceleration detecting beam to a position opposite the thinner flexing portion of said acceleration detecting beam;

a base substrate on which said supporting substrate is mounted; and first and second lead pins electrically connected to said first electrode and said fixed electrode, respectively, for conducting signals from said first and fixed electrodes.

4. The capacitive acceleration detector of claim 3 including a cover attached to said base substrate covering said first electrode, said pedestal, said supporting substrate, and said fixed electrode and a dielectric oil filling the space between said cover and said base substrate.

* * * * *

UNITED STATES PATENT AND TRADEMARK OFFICE
CERTIFICATE OF CORRECTION

PATENT NO. :   5,410,915
DATED      :   May 2, 1995
INVENTOR(S) :  Masahiro Yamamoto It is certified that error appears in the above-indentified patent and that said Letters Patent is hereby corrected as shown below:

Column 4, Line 25, change "aid" to --said--.

Signed and Sealed this

First Day of August, 1995

Attest:

BRUCE LEHMAN

*Attesting Officer*        *Commissioner of Patents and Trademarks*